United States Patent [19]
Johnson

[11] Patent Number: 5,882,379
[45] Date of Patent: Mar. 16, 1999

[54] INDICATOR ARRANGEMENT FOR AIR CLEANER SYSTEMS AND METHODS THEREOF

[75] Inventor: Steven Andrew Johnson, St. Paul, Minn.

[73] Assignee: Donaldson Company, Inc., Minneapolis, Minn.

[21] Appl. No.: 938,341

[22] Filed: Sep. 26, 1997

[51] Int. Cl.[6] .......................... B01D 29/11; B01D 29/66
[52] U.S. Cl. ............................... 95/19; 55/302; 55/310; 55/429; 96/405; 96/421
[58] Field of Search ........................... 55/302, 310, 428, 55/429; 95/19–22; 96/398, 405, 421, 428

[56] References Cited

U.S. PATENT DOCUMENTS

| | | | |
|---|---|---|---|
| 3,068,831 | 12/1962 | Witchell | 116/70 |
| 3,178,868 | 4/1965 | Gilday | 55/302 X |
| 3,258,960 | 7/1966 | Baden et al. | 73/118 |
| 3,443,365 | 5/1969 | Lee et al. | 55/274 |
| 3,803,814 | 4/1974 | Parsons, Jr. | 55/302 X |
| 3,902,999 | 9/1975 | Hawley | 96/421 |
| 4,020,783 | 5/1977 | Anderson et al. | 116/114 PV |
| 4,031,847 | 6/1977 | Sullivan | 116/65 |
| 4,133,658 | 1/1979 | Callewyn | 55/429 X |
| 4,184,376 | 1/1980 | Thomas et al. | 73/709 |
| 4,189,724 | 2/1980 | Onuma et al. | 340/607 |
| 4,395,269 | 7/1983 | Schuler | 55/302 |
| 4,475,933 | 10/1984 | Piggin | 55/302 X |
| 4,482,367 | 11/1984 | Howeth | 55/310 X |
| 5,110,331 | 5/1992 | Williams | 55/302 |
| 5,397,371 | 3/1995 | Hough | 55/302 |
| 5,735,919 | 4/1998 | Fujii et al. | 55/429 X |
| 5,746,795 | 5/1998 | Witter | 55/429 X |

FOREIGN PATENT DOCUMENTS

| | | | |
|---|---|---|---|
| 05-115733 | 5/1993 | Japan | 95/19 |

*Primary Examiner*—Robert Spitzer
*Attorney, Agent, or Firm*—Merchant, Gould, Smith, Edell, Welter & Schmidt, P.A.

[57] ABSTRACT

A dust collector system includes a conduit defining an interior volume, having a first open end, and including an air vent. A pressure differential detector includes a first air flow tap, a second air flow tap, and a pressure differential indicator. The first air flow tap is connected to a dust filter unit dirty air plenum. The second air flow tap is connected to the sensor conduit internal volume at a portion above a location corresponding to a level of collected dust to be detected. The pressure differential detector indicates a presence of at least a selected pressure differential between the first and second air flow taps. When a level of dust in the dust collection container reaches a selected level, it will close the sensor conduit first end. When the sensor conduit first end is closed, a pressure within the sensor conduit internal volume will rise towards atmospheric as a result of the air flow through the air vent. When the pressure within the sensor conduit internal volume rises, the detector will detect a selected pressure differential between the first and second taps and will indicate the presence of the selected pressure differential with the indicator.

17 Claims, 2 Drawing Sheets

INDICATOR ARRANGEMENT FOR AIR CLEANER SYSTEMS AND METHODS THEREOF

FIELD OF THE INVENTION

The present invention relates to air filtering systems, particularly dust collector systems. In particular, the present invention relates to a dust collector system including an indicator arrangement for detecting when an amount of dust collected has reached or exceeded a certain amount.

BACKGROUND OF THE INVENTION

In many industries, filtering systems are used to filter particulate matter, such as dust, from air or processed gasses. For example, industrial processes may generate particulate matter that needs to be removed from air in the factory. These filtering systems typically include at least one filter element which contains filter media that is useful for entrapping the dust and other particulate matter.

The dust and particulate matter removed from the air or gas is typically collected in some sort of container, such that it can be easily disposed of. Typical collection systems may include drums or barrels, in which the dust and particulate matter is directed to, generally by gravity from the dust collection system. After a period of operation, the collector container starts to fill in volume with the collected dust or particulate matter. After a period of time, it becomes necessary to empty (or replace) the collection container.

SUMMARY OF THE INVENTION

A preferred dust collector system comprises a dust filter unit, a dust collection container, a sensor conduit, and a pressure differential detector. The dust filter unit includes a housing having a clean air plenum and a dirty air plenum. The dust filter unit includes a blower oriented to selectively draw air from the dirty air plenum to the clean air plenum. The dust collection container is oriented to be in air and dust flow communication with the dirty air plenum of the dust filter unit. The sensor conduit defines an interior volume and has a first open end. The first open end is positioned within the dust collection container at a position where at a selected level of collected dust is to be detected. The sensor conduit has an external section including an air vent therein, and is positioned externally to the collection container. The pressure differential detector includes a first air flow tap, a second air flow tap, and a pressure differential indicator. The first air flow tap is connected in air flow communication with the dust filter unit dirty air plenum. The second air flow tap is connected in air flow communication with the sensor conduit internal volume at a portion of the sensor conduit above a location corresponding to a level of collected dust to be detected. The pressure differential indicator is constructed and arranged to indicate a presence of at least a selected pressure differential between the first and second air flow taps.

Preferably, the dust filter unit, dust collection container, sensor conduit, and pressure differential detector are operably assembled such that dust filtered in the dust filter unit is selectively directed into the dust collection container; and, when a level of dust in the dust collection container reaches a selected level, it will enclose the sensor conduit first end. When the sensor conduit first end is closed, a pressure within the sensor conduit internal volume will rise toward atmospheric as a result of the air flow through the air vent. When the pressure within the sensor conduit internal volume rises, the detector will detect a selected pressure differential between the first and second taps and will indicate the presence of the selected pressure differential with the indicator.

In one preferred arrangement, the air vent in the sensor conduit external section has an average vent cross sectional area of no greater than about 0.02 square inches (about 13 sq. mm). Preferably, the air vent has a circular cross section with a diameter within the range of about 0.03 inches (about 0.8 mm) to about 0.16 inches (about 4 mm).

In one preferred embodiment, the dust collection container comprises a drum having a sealed cover. Preferably, the drum sealed cover includes a sealed dust flow aperture therethrough, and a sealed sensor conduit aperture therethrough.

In preferred arrangements, the sensor conduit comprises an extension of pipe. The sensor conduit first end is an open pipe end having a diameter within the range of about 0.75 inches (about 19 mm) to about 1 inch (about 25 mm). The sensor conduit first end preferably is directed downwardly and is oriented within a distance of about 3.6 inches (about 9 cm) to about 20 inches (about 51 cm) below the drum sealed cover. In some preferred arrangements, the drum is a 55 gallon drum.

Preferably the sensor conduit comprises an assembly including a pipe, couplings, and flexible tubing. Preferably, the cover comprises steel.

In one preferred embodiment, the dust filter unit includes a lower dust collection hopper, with the drum being operably positioned beneath the hopper. The drum cover preferably is operably connected in air and dust flow communication with the hopper by a flexible hose coupling. Preferably, the flexible hose coupling comprises hose duct having an inside diameter of about 14 inches (about 36 cm).

The invention is also directed to a preferred pressure differential detection arrangement. The preferred arrangement comprises a sensor conduit and a pressure differential detector mounted on the sensor conduit. The sensor conduit defines an interior volume and has a first open end. The sensor conduit has an external section including an air vent therein, the air vent having a cross-sectional area within the range of about 0.0007 square inches (about 0.5 sq. mm) to about 0.02 square inches (about 13 sq. mm). The first open end has a cross-sectional area of at least about 0.4 square inches (about 258 sq. mm). The pressure differential detector includes a first air flow tap, a second air flow tap, and a pressure differential indicator. The pressure differential indicator comprises a pressure gauge constructed and arranged for detecting a pressure differential between the first and second air flow taps. The first air flow tap is connected in air flow communication with the sensor conduit interior volume.

Preferably, the sensor conduit comprises an extension of circular pipe having an inside diameter of about 0.75 inches (about 19 mm) to about 1 inch (about 25 mm). In preferred arrangements, the sensor conduit circular pipe comprises a nylon barbed tube fitting.

In one preferred embodiment, the air vent is circular and has a diameter of about 0.03 inches (about 0.8 mm) to about 0.16 inches (about 4 mm).

In preferred systems, the pressure gauge comprises a pneumatic pressure differential gauge.

A preferred method of detecting whether a collected dust level, in a dust collection container of a dust collection system, has reached a selected level is provided. The preferred method includes a step of continuously monitoring for presence of selected pressure differential between an interior of a sensor conduit in air flow communication with an interior of the dust collection container and a dirty air plenum in the dust collection system. The sensor conduit includes an open, downwardly directed end positioned at a level of collected dust to be indicated, and an open air vent positioned exterior to the dust collection container. The step of continuously monitoring is conducted until a level of collected dust closes the open end of the sensor conduit and a pressure differential between the sensor conduit interior and the dirty air plenum is detected, due to air leakage into the sensor conduit through the vent.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENT

The present invention provides for an indicator arrangement which provides information when a dust collection container has collected a certain level of material. For example, a dust collector system may funnel dust into a drum for collection. The indicator arrangement will inform the operator when the drum has reached a selected level, typically, a full level.

Figure 1:
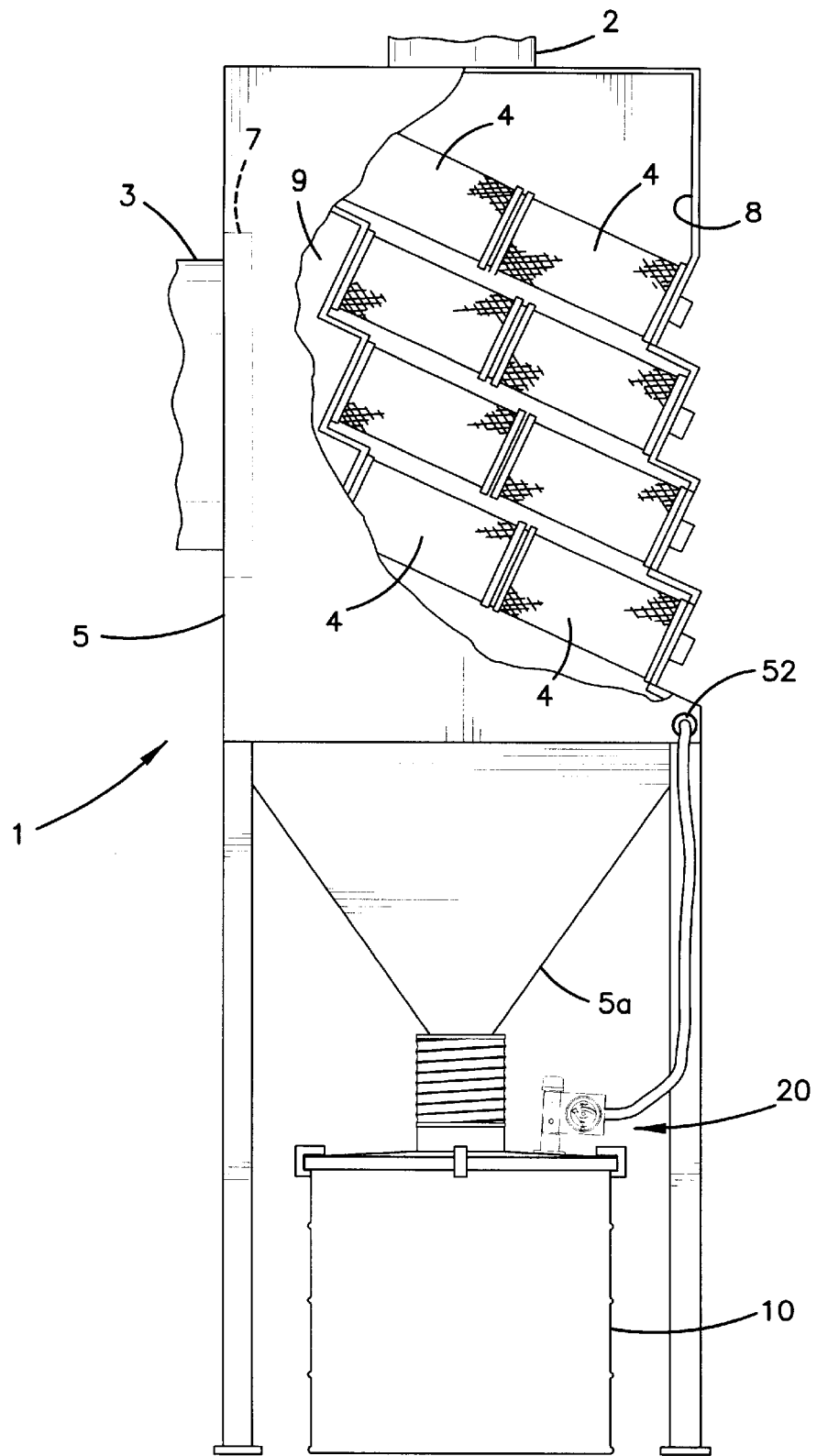
FIG. 1 is a schematic, side elevational view, with portions broken away, of a dust collector and dust collection container including an indicator arrangement, according to the present invention.

In reference to FIG. 1, one type of industrial dust collector or air filtration system in which the indicator arrangement of the present invention is utilized is shown generally at 1. With the exception of the indicator arrangement, the system 1 may be generally as described as U.S. Pat. No. 4,395,269, hereby incorporated by reference. Dirty or contaminated air or processed gasses enter the dust collector 1 at dirty air inlet 2, and filtered, or clean, air or gasses exit the collector 1 at the clean air exit 3. FIG. 1 depicts a side view with portions of a housing 5 broken away so that filter elements 4 are viewable. A blower assembly 7 draws dirty air through the dirty air inlet 2, into a dirty air plenum 8, through the filter elements 4, into a clean air plenum 9, and out through the clean air exit 3.

Much of the particulate matter, including dust, filtered from the air or gasses drops from the filter element 4 through funneled housing 5a, and into a collection container, barrel or drum 10 for removal. An indicator arrangement 20 is shown mounted to the drum 10. Typically, the drum 10 is a 55-gallon drum, but of course can include other sizes.

Figure 2:
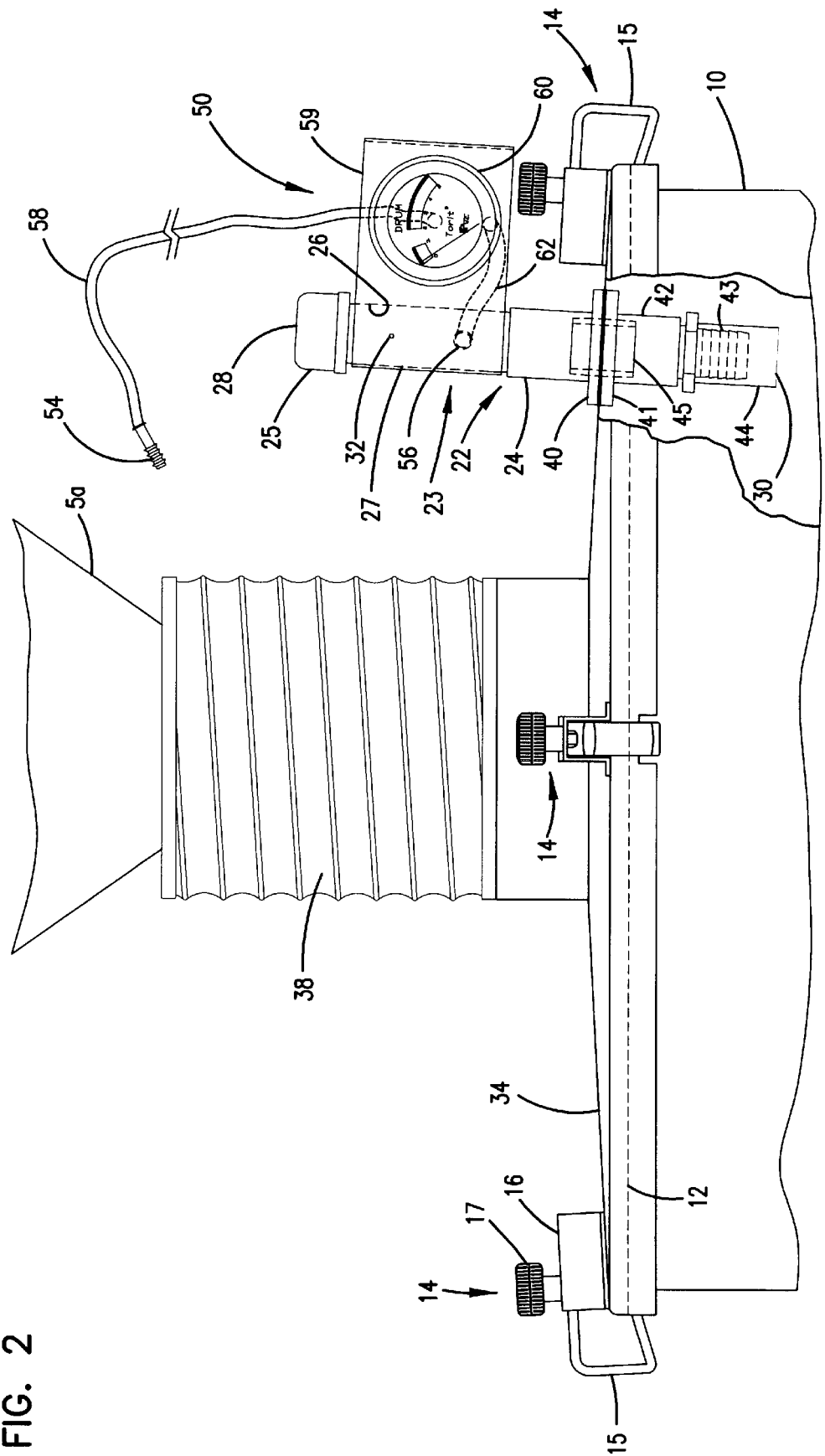
FIG. 2 is a schematic, enlarged, side elevational view of the indicator arrangement mounted on the dust collection container depicted in FIG. 1, according to the present invention.

In reference to FIG. 2, the drum 10 for containing the collected dust includes a cover member 34. The cover member 34 includes an O-ring gasket 12, along the inner wall of the periphery of the cover member 34. When the cover member 34 is positioned on the drum 10, the O-ring gasket 12 helps to seal the interior of the drum 10 from airflow between the cover member 34 and the drum 10.

A plurality of clamp mechanisms 14 help to secure the cover member 34 to the drum 10. Preferably, four clamp mechanisms 14 are attached to the cover member 34 and provide for a tight connection to the drum 10. In the embodiment illustrated, three of the clamp mechanisms are shown, with the fourth being on an opposite side of the FIG. 2 side elevational view. While a variety of working embodiments are contemplated, in the specific embodiment shown, each of the clamp mechanisms 14 includes a hook member 15, a holder 16, and a fastener 17. The hook member 15 is slidably mounted within the holder 16, and defines a slot for accommodating the fastener 17. To secure the cover member to the drum 10, the hook member 15 is slid within the holder 16, until it engages a lip on the drum 10, and the fastener 17 tightens the hook member 15 in place.

In an alternate embodiment, the drum 10 and drum cover member 34 are not secured by any clamping mechanisms. The weight of the cover member 34, in combination with the O-ring gasket 12, provide for an adequate amount of fluid (air) sealing between the cover member 34 and the drum 10.

A flexible hose coupling 38 operably connects the drum cover 34 in air and dust flow communication with the hopper 5a. In this way, after dust is filtered from the air, it falls by gravity through the hopper 5a and into the drum 10. The hose coupling 38 helps to prevent dust or air from leaking through the connection. Preferably, the flexible hose coupling 38 comprises hosing duct. The size of the flexible hose coupling 38 depends on the size of the air cleaner 1. In the preferred arrangement, the coupling 38 has an inside diameter of about 14 inches.

The indicator arrangement 20 provides information for when the level of dust collected in the drum 10 has reached a certain, pre-selected level. In general, the indicator arrangement 20 uses differential air pressure as a way to detect when collected dust within the drum 10 has reached the pre-selected level. The differential air pressure drives a pressure sensitive gauge that gives the indication that collected dust within the drum has reached the pre-selected level.

In the particular embodiment illustrated in FIG. 2, the indicator arrangement 20 includes a sensor conduit 22. The sensor conduit 22, in the FIG. 2 embodiment, includes a tubular assembly 23 comprising a cylindrical tube, or pipe 27 defining an interior volume 26. The pipe 27 is covered or closed at a closed end 28 by a cap member 25. The pipe 27 defines an air vent 32 therein. While the air vent 32 may be a variety of shapes and sizes, in the particular embodiment illustrated, the air vent 32 is circular with a diameter of about 0.03 inches (about 0.8 mm) to about 0.16 inches (about 4 mm), preferably about 0.09 inches (about 2 mm). Preferably, the area of the air vent 32 is larger than an amount that will easily clog shut. Typically, the area of the air vent 32 is at least about 0.0007 sq. inches (about 0.5 sq. mm). Preferably, the area of the air vent 32 is no greater than about 0.02 sq. inches (about 13 sq. mm). One preferred area of air vent 32 is about 0.006 sq. inches (about 4 sq. mm). The air vent 32 cooperates with other structure to provide information to the indicator arrangement when the level of dust in the drum 10 has reached a certain pre-selected level.

In one preferred arrangement, the pipe 27 comprises an iron pipe extending a length of about 4 inches, and having an inner diameter of about 1 inch.

Still referring to FIG. 2, the tubular assembly 23 of the sensor conduit 22 is mounted with a fluid tight seal within an aperture defined by the cover member 34 to extend into the drum 10 and below the cover member 34. In the particular embodiment illustrated, the sensor conduit 22 is mountably secured to the drum cover member 34 by a first coupling 24, a pair of washers 40, 41, and a second coupling 42. The first coupling 24 is secured to the pipe 27 through suitable means, such as threads. A nipple pipe 45 secures the first coupling 24 to the second coupling 42. When assembled as shown in the illustrated arrangement, a periphery of the aperture defined by the cover member 34 is trapped between opposing surfaces of the washers 40, 41. A silicone gel is preferably used between the washers 40, 41 and the cover member 34, to help ensure a fluid-tight seal. One suitable gel is translucent RTV 108, available from General Electric.

Preferably, each of the first and second couplings 24, 42 comprises an iron coupling, extending a length of about 2.9 inches (about 7 cm), and having an inner diameter of about 1 inch (about 25 mm). Preferably, each of the washers comprises an iron washer, about 0.25 inches (about 6 mm) in thickness.

Still referring to FIG. 2, the tubular assembly 23 of the sensor conduit 22 includes a tube fitting 43 secured to the second coupling 42. The tube fitting 43 preferably comprises nipple nylon barbed tube fitting, extending a length of about 2 inches, an inner diameter of about 0.75 inches (about 19 mm), and an outer diameter of about 1 inch (about 25 mm). Also part of the tubular assembly 23 is an extendable conduit section to allow for adjustment for the level of dust to be detected. In general, an open end 30 of the sensor conduit 22 will extend at least some distance below the cover member 34 and into the drum 10. The level which the open end 30 is mounted corresponds in general to the level of dust selected by the user which he wants detected. Stated another way, when the open end 30 of the sensor conduit 22 is covered with dust, the indicator arrangement 20 will give out a signal stating that the drum 10 has accumulated a volume of dust which has reached that level of where the open end 30 is positioned. This may, for example, be a convenient way for indicating when the drum 10 has collected its full capacity of dust.

In the particular embodiment illustrated, one example of an adjustable conduit section is shown as tubing 44. Preferably, tubing 44 defines the open end 30 and is attached to the tube fitting 43. Tubing 44 may vary in length, depending upon the level of dust the user would like to detect in the drum 10.

Preferably, tubing 44 comprises a flexible material, which is easily trimmable, such that the user can conveniently trim the amount of tubing 44 to conform to the level of dust desired to be detected. The longer the length of tubing 44, the lower the amount of dust level which will be detected. If the user would like to detect a high level of dust, the user may trim the tubing 44 to a shorter length; conversely, if the user would like to detect a lower level of dust, the user may trim the tubing 44 to a longer length.

Preferably, the tubing 44 comprises PVC tubing, and includes an inner diameter of about 1 inch (about 25 mm), defining a cross-sectional area of about 0.8 sq. inches (about 5 sq. cm). Together with the second coupling 42 and washer 41, the tubing 44 extends a length below the cover member 34 anywhere from about 6 inches (about 15 cm) to as low as near the bottom of the dust collection container. In one example, the tubing 44, second coupling 42, and washer 41 extend about 20 inches (about 51 cm) below the cover member 34.

In an alternate embodiment, the tubing 44 is omitted altogether. In this alternate embodiment, the sensor conduit 22 has an open end defined by the open end of the tube fitting 43. In this alternate embodiment, the tubular assembly 23 extends below the cover member 34 a distance of at least about 3 inches (about 8 cm), and typically about 3.6 inches (about 9 cm). Thus, the level of dust detected will correspond to a level about 3.6 inches (about 9 cm) below the cover member 34.

In accordance with the invention, the indicator arrangement 20 includes a pressure differential detector constructed and arranged to indicate a presence of at least a selected pressure differential between at least two different air flow taps. In the illustrated embodiment, a pressure differential indicator is shown generally at 50, FIG. 2. The pressure differential indicator 50 includes a first air flow tap 52 secured or connected in air flow communication with the dust filtered dirty air plenum 8, FIG. 1. Referring again to FIG. 2, a second air flow tap 56 is connected in air flow communication with the sensor conduit 22 internal volume 26, and above a location corresponding to a level of collected dust to be detected. In the illustrated embodiment, the second air flow tap 56 is circular with a diameter of about 0.3 inches (about 8 mm).

A gauge 60 is connected to the first air flow tap 52 and second air flow tap 56. In the particular embodiment illustrated, the gauge 60 comprises a pneumatic pressure differential gauge. One suitable gauge is Model No. 194873-01 available from Dwyer Instruments, Inc., P.O. Box 373, Michigan City, Ind. 46360.

Still referring to FIG. 2, the first air flow tap 52 (FIG. 1), attached to the dirty air plenum 8 (FIG. 1), is attached to the gauge 60 through flexible tubing 58 and a connector 54. A second extension of flexible tubing 62 attaches the gauge 60 to the second air flow tap 56. A bracket member 59 secures the gauge 60 to the tubular assembly 23.

The pressure differential detector 50 is constructed and arranged to indicate a presence of at least a selected pressure differential between the first air flow tap 52 and the second air flow tap 56. That is, the detector 50 can sense when the air pressure in the dirty air plenum 8 of the air cleaner system 1 is different from the air pressure in the sensor conduit 22 (which is in air fluid flow communication with the drum 10).

Specifically, the first air flow tap 52 is under a negative air pressure, during operation of the air cleaner system 1. When the drum 10 is empty and prior to the amount of dust collected reaching a pre-selected level, the amount of air pressure in the drum 10 is approximately equal to the negative air pressure in the dirty air plenum 8. It should be noted that the area of the air vent 32 is smaller than the area of the open end 30 of the pipe 24. In preferred arrangements, the area of the air vent 32 is from about 0.09% to about 5%, and preferably about 0.8%, of the area of the open end 30 of the sensor conduit 22. While the air vent 32 vents to atmospheric pressure, the second air flow tap 56 vents to the pressure of the internal volume 26 of the sensor conduit 22. When the amount of dust in the drum 10 has not reached the pre-selected level which covers the open end 30 of the sensor conduit 22, the atmospheric pressure effects through the vent 32 are much smaller than the negative pressure effects in the drum 10 (which are conveyed through the open end 30 into the internal volume 26 of the pipe 24). Thus, when the dust has not reached a level which covers the open end 30 of the sensor conduit 22, the pressures detected in the first air flow tap 52 and second air flow tap 56 are about equal. The pressure differential 50 detects negligible differences between the dirty air plenum 8 and the internal volume 26 of the pipe 24. The gauge 60 shows a reading of about zero.

After a period of operation, the level of dust collected within the drum 10 will rise to a level that covers the open end 30 of the sensor conduit 22. When this happens, the pressure in the internal volume 26 of the pipe 24 becomes equal to atmospheric pressure, due to the vent hole 32. The first air flow tap 52, however, is still attached to the dirty air plenum 8 of the air cleaner 1, and is under a negative air pressure. Therefore, the pressure differential 50 detects a real pressure difference between the pressure within the dirty air plenum 8 and the internal volume 26 of the pipe 24. The gauge 60 provides operator that the drum 10 is o an indication to the operator that the drum 10 is full, or has reached or exceeded the pre-selected level. In other words, the operator will know that the amount of dust and particulate matter collected in the drum 10 has covered the open end 30 of the sensor conduit 22. At that point, the operator may change out the drum 10.

It should be noted that when the dust collector system 1 is not operating, the air pressure in the dirty air plenum 8 and the air pressure in the internal volume 26 of the pipe 24 are both at atmospheric pressure; therefore, there is no pressure differential, and the pressure gauge 60 will indicate that the drum 10 is not fill, or has not reached a level of dust corresponding to the pre-selected level.

When changing out the drum 10, the clamp mechanisms 14 are loosened, to unclamp the cover member 34 from the drum 10. The cover member 34 is lifted from the drum 10, and the drum is emptied of the collected dust. In emptying the drum 10, the open end 30 of the sensor conduit 22 is cleared from blockage by dust. The cover member 34 is then positioned on the empty drum 10, and the clamp mechanisms 14 are tightened, to secure the cover member 34 to the drum 10. The gauge 60 will then indicate that the drum is not full.

It should be noted that the sensor conduit 22 may be constructed from a single structural member, with appropriate holes for the vent and the air flow tap. The illustrated embodiment uses an assembly of parts, and is preferred, because of the availability of inexpensive, standard parts which make up the assembly. However, a single conduit member could be fabricated and fit with appropriate accommodations into the cover member 34 of the drum 10.

The above specification, examples and data provide a complete description of the manufacture and use of the invention. Many embodiments of the invention can be made without departing from the spirit and scope of the invention.

I claim:

1. A dust collector system comprising:
   (a) a dust filter unit including a housing defining a clean air plenum and a dirty air plenum;
      (i) said dust filter unit including a blower oriented to selectively draw air from said dirty air plenum to said clean air plenum;
   (b) a dust collection container in air and dust flow communication with said dirty air plenum;
   (c) a sensor conduit defining an internal volume and having a first open end;
      (i) said sensor conduit first open end being positioned within said dust collection container at a position whereat a selected level of collected dust is to be detected;
      (ii) said sensor conduit having an external section including an air vent therein; said external section being positioned externally to said collection container;
   (d) a pressure differential detector including: a first air flow tap; a second air flow tap; and, a pressure differential indicator;
      (i) said first air flow tap being connected in air flow communication with said dust filter unit dirty air plenum;
      (ii) said second air flow tap being connected in air flow communication with said sensor conduit internal volume at a portion of said sensor conduit above a location corresponding to a level of collected dust to be detected;
      (iii) said pressure differential detector being constructed and arranged to indicate a presence of at least a selected pressure differential between said first and second air flow taps;
   (e) said dust filter unit, dust collection container, sensor conduit and pressure differential detector being operably assembled such that:
      (i) dust filtered in said dust filter unit is selectively directed into said dust collection container;
      (ii) when a level of dust in said dust collection container reaches a selected level, it will enclose said sensor conduit first open end;
      (iii) when said sensor conduit first open end is closed, a pressure within said sensor conduit internal volume will rise toward atmospheric as a result of air flow through said air vent; and,
      (iv) when the pressure within the sensor conduit internal volume rises, said detector will detect a selected pressure differential between the first and second taps and will indicate the presence of the selected pressure differential with said indicator.

2. A dust collector system according to claim 1 wherein:
   (a) said air vent in said sensor conduit external section has an average vent cross-sectional area of no greater than 0.02 square inches.

3. A dust collector system according to claim 2 wherein:
   (a) said air vent has a circular cross-section with a diameter within the range of about 0.03 inches to about 0.16 inches.

4. A dust collector system according to claim 1 wherein:
   (a) said dust collection container comprises a drum having a sealed cover;
      (i) said drum sealed cover including a sealed dust flow aperture therethrough; and,
      (ii) said drum sealed cover including a sealed sensor conduit aperture therethrough.

5. A dust collector system according to claim 4 wherein:
   (a) said sensor conduit first open end is an open pipe end having a diameter within the range of about 0.75 inches to about 1 inch;
      (i) said sensor conduit first open end being directed downwardly and being oriented at least about 3.6 inches below said drum sealed cover.

6. A dust collector system according to claim 5 wherein:
   (a) said drum is a 55 gallon drum.

7. A dust collector system according to claim 6 wherein:
   (a) said sensor conduit comprises an assembly including a pipe, couplings, and flexible tubing.

8. A dust collector system according to claim 5 wherein:
   (a) said cover comprises steel.

9. A dust collector system according to claim 4 wherein:
   (a) said dust filter unit includes a lower dust collection hopper;
   (b) said drum is operably positioned beneath said hopper; and,
   (c) said drum cover is operably connected in air and dust flow communication with said hopper by a flexible hose coupling.

10. A dust collector system according to claim 9 wherein:
(a) said flexible hose coupling comprises hose duct having an inside diameter of about 14 inches.

11. A pressure differential detection arrangement comprising:
(a) a sensor conduit defining an interior volume and having a first open end;
  (i) said sensor conduit having an external section including an air vent therein; said air vent having a cross-sectional area within the range of about 0.0007 square inches to about 0.02 square inches;
  (ii) said first open end having a cross-sectional area of at least 0.4 square inches; and,
(b) a pressure differential detector mounted on an exterior portion of said sensor conduit; said pressure differential detector including a first air flow tap, a second air flow tap and a pressure differential indicator;
  (i) said pressure differential indicator comprising a pressure gauge constructed and arranged for detecting a pressure differential between said first and second air flow taps; and,
  (ii) said first air flow tap being connected in air flow communication with said sensor conduit interior volume.

12. An arrangement according to claim 11 wherein:
(a) said sensor conduit comprises an extension of circular pipe having an inside diameter of about 0.75 inches to about 1 inch.

13. An arrangement according to claim 12 wherein:
(a) said sensor conduit circular pipe comprises a nylon barbed tube fitting.

14. An arrangement according to claim 13 wherein:
(a) said air vent is circular and has a diameter of about 0.03 inches to about 0.16 inches.

15. An arrangement according to claim 14 wherein:
(a) said pressure gauge comprises a pneumatic pressure differential gauge.

16. An arrangement according to claim 15 wherein:
(a) said sensor conduit pipe extension is at least 3 inches long.

17. A method of detecting whether a collected dust level, in a dust collection container of a dust collection system, has reached a selected level; said method comprising steps of:
(a) continuously monitoring for presence of a selected pressure differential between:
  (i) an interior of a sensor conduit in air flow communication with an interior of the dust collection container; the sensor conduit having:
    (A) an open, downwardly directed end positioned at a level of collected dust to be indicated; and
    (B) an open air vent positioned exterior to the dust collection container; and,
  (ii) a dirty air plenum in the dust collection system;
(b) said step of continuously monitoring being conducted until a level of collected dust closes the open end of the sensor conduit and a pressure differential between the sensor conduit interior and the dirty air plenum is detected, due to air leakage into the sensor conduit through the vent.

* * * * *